Sept. 25, 1923.

J. W. STUBBLEFIELD

FLOOR SURFACING MACHINE

Filed Dec. 22, 1922

INVENTOR
J. W. STUBBLEFIELD
BY Hazard & Miller
ATT'YS.

Sept. 25, 1923. J. W. STUBBLEFIELD 1,469,028
FLOOR SURFACING MACHINE
Filed Dec. 22, 1922 3 Sheets-Sheet 2
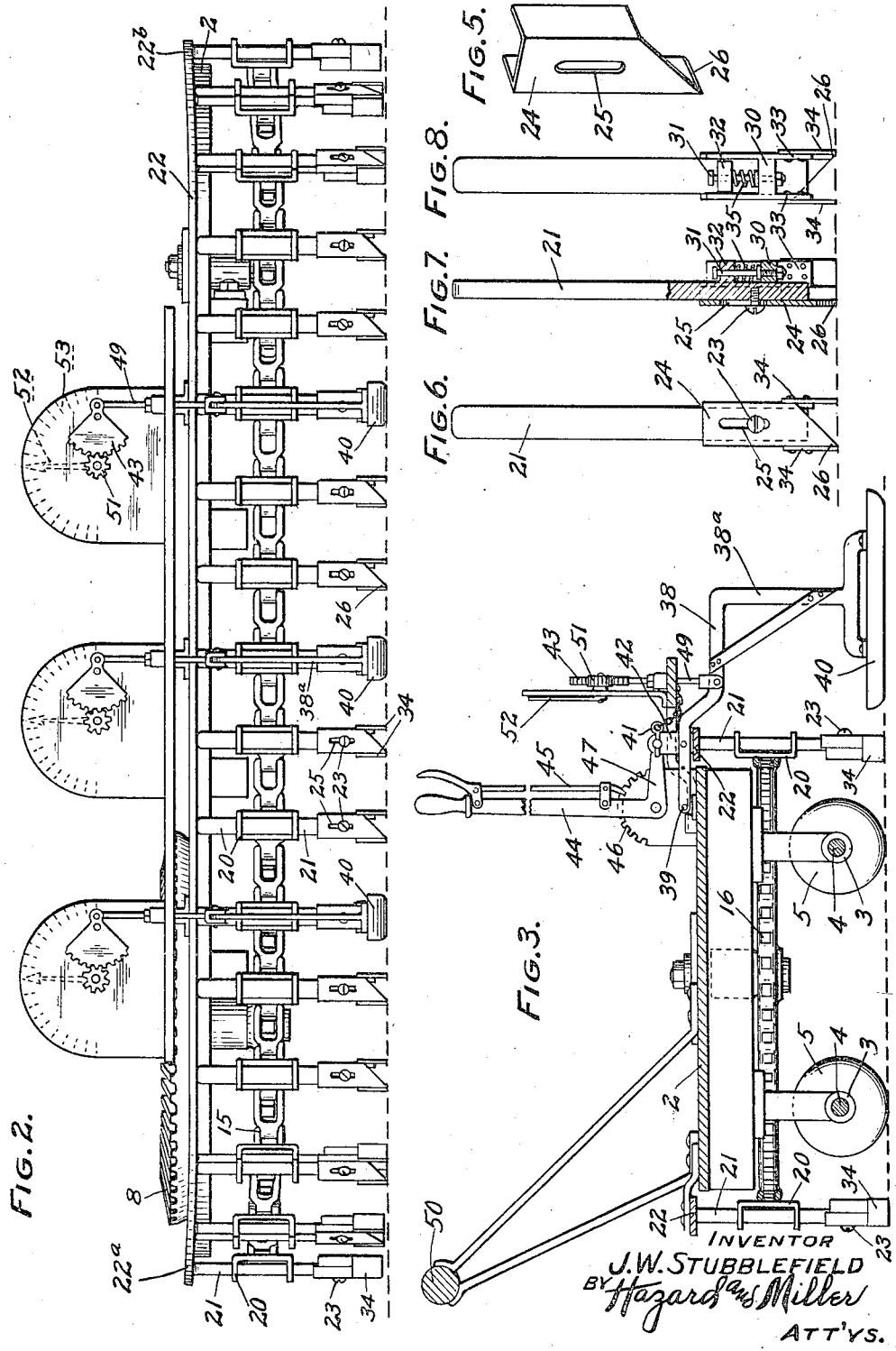
INVENTOR
J. W. STUBBLEFIELD
BY Hazard and Miller
ATT'YS.

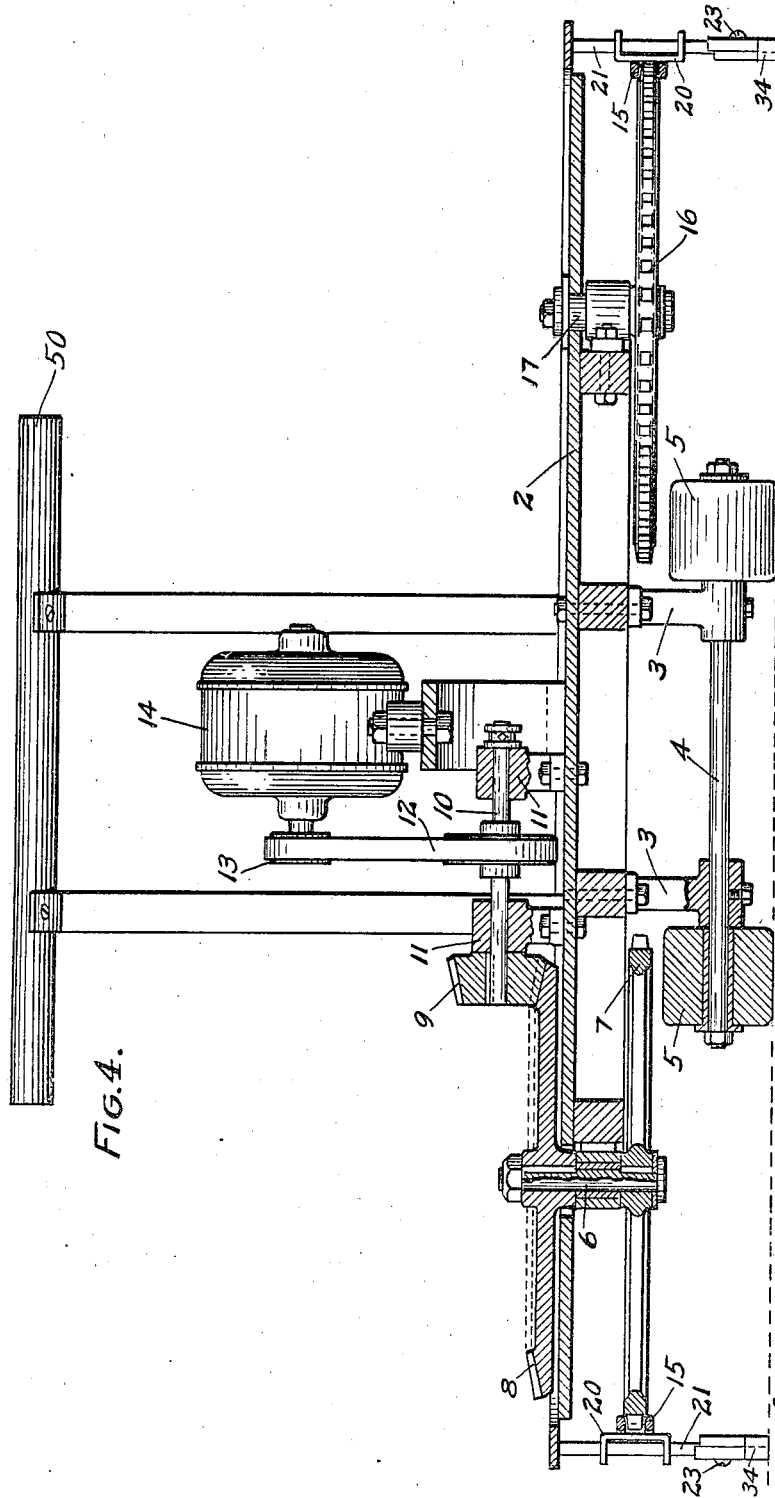

Patented Sept. 25, 1923.

1,469,028

UNITED STATES PATENT OFFICE.

JOSEPH W. STUBBLEFIELD, OF LOS ANGELES, CALIFORNIA.

FLOOR-SURFACING MACHINE.

Application filed December 22, 1922. Serial No. 608,490.

*To all whom it may concern:*

Be it known that I, JOSEPH W. STUBBLEFIELD, a citizen of the United States, residing at Los Angeles, in the county of Los Angeles and State of California, have invented new and useful Improvements in Floor-Surfacing Machines, of which the following is a specification.

This invention relates to machines for surfacing wooden floors, and it is an object of the invention to provide a machine having an endless traveling belt operating in a horizontal orbit about vertical axes, and which belt is provided with a series of carrying blocks in which are mounted scraping and polishing tools including tool shanks. Another object of the invention is to provide an adjustable means for pressing the tool shanks downwardly so as to carry the effective cutting or scraping means into effective position with different degrees of pressure according to the general undulations of the floor; the cutting means being designed to smooth out slight irregularities caused by differences of thickness and unevenness at the longitudinal meeting edges of the flooring.

Other objects and advantages will be made manifest in the following specification of an embodiment of the invention illustrated in the accompanying drawings, wherein—

Fig. 2 is a front elevation of the operative mechanism, certain of the elements being omitted from the upper portion of the machine.

Fig. 3 is a transverse section substantially on line 3—3 of Fig. 1.

Fig. 4 is a longitudinal vertical section of the machine.

Fig. 5 is a perspective of one of the detached scrapers.

Fig. 6 is a side elevation of one of the polishing and scraping tools assembled.

Fig. 7 is a longitudinal central section of the assembled scraping tool.

Fig. 8 is a reverse side elevation of the scraping tool.

Figure 1:
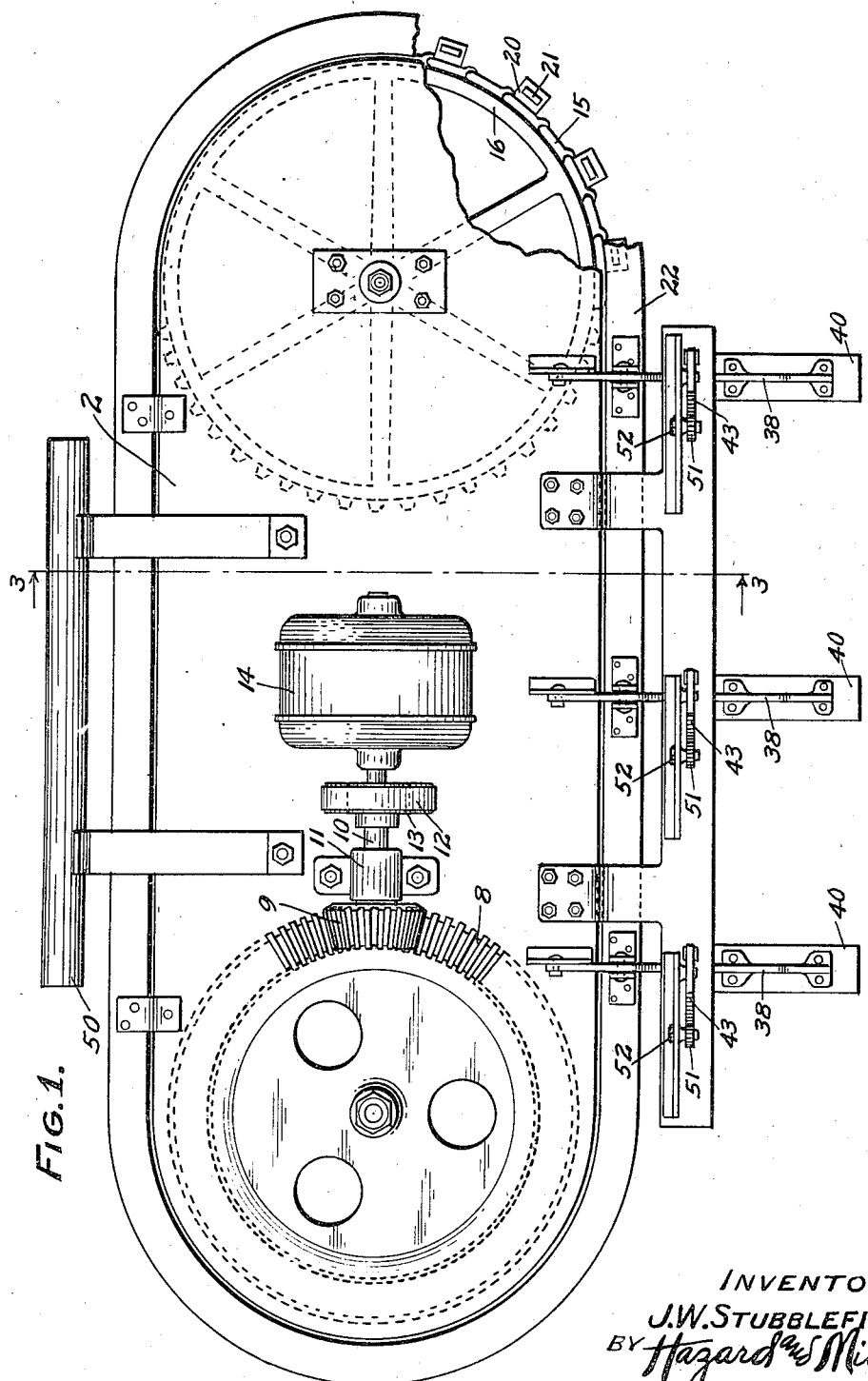
Figure 1 is a plan of the preferred embodiment of the invention, a portion of the structure of which is broken away.

The machine embodies a suitable frame having a top plate 2 provided on its under face with downwardly extending bearings 3—3, and these bearings are provided with shafts 4 carrying rollers or wheels 5 forming the primary support for the machine. Adjacent one end of the machine plate or top 2 is a perpendicular shaft 6 passing through the plate and having on its lower end a sprocket wheel 7 and on its upper end a bevel gear 8 which is in constant mesh with a driving pinion 9 secured on a countershaft 10 mounted in suitable bearings 11. This countershaft is driven by a transmission belt 12 engaging a motor pulley 13 on the shaft of a motor 14.

The sprocket wheel 7 is arranged horizontally to rotate on a vertical axis, and around the wheel passes any suitable form of endless traveling belt, which is here shown as of sprocket chain form 15. This endless sprocket chain is laid horizontally and passing from the sprocket wheel 7 extends over to the opposite end of the machine and engages an idler and adjustable sprocket wheel 16 secured on the lower end of a shaft 17 mounted in the machine frame. From this it will be seen that the links of the chain are adapted to traverse a horizontal orbit which has preferably straight parallel portions at the front and back of the machine and below the machine top plate 2.

The sprocket chain or belt forms a continuously running carrier for drawing scraping and polishing means over a floor surface which is to be superficially smoothed, that is means are provided for taking out the slight differences in the floor surface caused by uneven edges of the flooring strips, but not being operative to cut the top surface of the floor into a common plane. Means are provided for so positioning and regulating the action of the cutting means so that these can be released as they approach a convexly curved portion of the floor surface, and means are also provided for pressing the cutting and polishing means into effective position as may be necessary.

The endless sprocket chain or belt has a suitable number of its links provided with carrying lugs 20 provided with vertically disposed apertures in which are slidably mounted tool bars or shanks 21. The shanks extend substantially perpendicularly as shown in Fig. 2, and their upper ends are designed to engage a cam rail or pressure and guide means, such rail being indicated at 22 and forming a substantially endless approximately horizontal device supported around the top of the machine. The cam rail 22 has front and rear substantially parallel straight portions and has the end portions curved in a semicircle corresponding to the orbit of the driving belt 15.

The tool shanks 21 are adapted to slide freely in their guide blocks 20, and on the lower end of each tool shank is provided a suitable fastening device in the form of a screw 23 projecting outwardly and whereby an adjustable scraper may be secured in position on the lower end of the tool shank. A form of scraper is clearly shown in Fig. 5 as consisting of a channel-shaped element having a front face 24 which is slotted at 25 to receive the clamp screw 23. One of the side flanges of the scraper extends downwardly to form a cutting edge 26 below the lower end of the shank 21. Thus it will be seen that in operation the scrapers 24 are adapted to be adjusted and secured on the lower ends of the tool shanks 21, and while the tools are being carried around by the driving belt 15, the effective edges 26 of the scrapers will operate to scrape off the uneven edges of the flooring; it being understood that the machine is moved in a path transversely to the strips of flooring and the straight stretches of the driving belt 15 meanwhile traveling parallel to the edges of the flooring strips.

Concurrently with the rough scraping action produced by the gang of scrapers one successively following the other in the cutting action, other means are effective to smooth off and polish the floor surface, and such means is shown as including a slide 30 having an upwardly extending shank 31 passing through a guide lug 32 provided therefor on the back face of each tool shank 21. The slide 30 has front and back cheeks the lower ends of which extend downwardly at 33, and to each cheek is applied polishing blades 34 having straight bottom edges designed to rest upon the surface being polished. The slides with the polishing blades 34 are yieldingly pressed downwardly independent of the bar by means of the expansion spring 35 interposed between the body of the slide 30 and the guide lug 32, or otherwise suitably arranged.

It will be seen then that as the cutter bars are drawn around in their orbit by the blade chain 15, the polishing blades 34 will be pressed with a suitable degree of pressure down to polish the surface following the action of the rough scrapers.

Since floors almost universally have a more or less undulating top surface, a feature of my invention is to provide means for relieving the cutter bars of positive downward pressure as they encounter the undulations of the floor, and I provide means which may be automatically or manually controlled for thus relieving the pressure on the bars. Such means is here shown as including a device for lifting the cam rail 22 along the front of the machine according to the undulating surface.

As clearly shown in Fig. 3, there is connected to the front portion of the rail 22 a forwardly extending lever arm 38, the rear end of which is pivoted at 39 on the top plate 2, and the forward end of which lever arm is turned downwardly at 38ª and carries a skid or shoe 40 on its lowermost end which is designed to slide over the floor surface during the forward movement of the machine on its rollers 5 in a line transverse to the flooring strips. The levers 38, of which there may be any suitable number, are each adapted to be pivotally connected as by a key or pin 41 to an upstanding lug 42 provided on the top of the front section of the rail 22. It will be seen, therefore, that when the shoes 40 ride upwardly on a convolution of the floor they will tend to lift the lever arms 38, and these in turn when keyed to the rail 22 will flex or bend the same upwardly and thus materially relieve the downward pressure on the tool bars 21 as they successively pass along underneath of the cam rail 22.

Means are provided for manually regulating the position of the cam rail 22, and such means includes a suitable number of hand levers 44 mounted on the top plate 2 and having locking latches 45 adapted to engage gear segments 46 which are concentric to the axis of the handles 44. Each handle 44 is provided with a lever arm 47 projecting forwardly and adapted to be fastened by the key or pin 41 of the cam rail lug 42. It will be seen that it is possible in the operating of the machine to regulate the action of the cam rail on the traveling tool bars.

To facilitate manual adjustment of the cam rail, automatically acting index means are provided for showing the convolutions of the floor surface, and such means include a push rod 49 of which one is shown as connected to each lever arm 38. Each push rod 49 extends upwardly and is connected to a quadrant 43 which in turn engages a pinion 51 which is secured to the shaft of an indicating finger 52 which is mounted in front of a suitable dial 53. A set of the dials 53 is supported upon the top plate 2 of the machine in such position that the movement of the fingers 52 can be readily observed by an operator from the rear of the machine.

The machine may be propelled in any desirable manner, and to facilitate manual operation has suitably arranged and mounted, at the rear thereof, a push handle 50.

From the above it will be obvious that when the driving motor 14 is energized its power will be transmitted through the transmission gears to the driven sprocket 7 which in turn will drive the belt chain, and this will be operated in a horizontal orbit, and the several tool bars 21 with the effective cutting means on the lower ends thereof will be driven constantly at a suitable rate of speed along their orbits while at the same time the machine is pushed with a slow movement transversely across the flooring strips. Each of the cutting bars with the cutting means, as it comes into engagement with the front section of the cam rail 22, is thereby forced downwardly or relieved, as the case may be, according to the floor undulations and the desired cut is made. As the cutting means passes from the front straight portion the pressure on the bars is fully relieved as by the upwardly deflected portion 22ª around at the end portion of the rail. The rear straight portion of the rail is sufficiently elevated or in such a higher plane as to substantially neutralize cutting action of the cutting tools. As the cutting bars come around from the rear they engage the downwardly deflected portion 22ᵇ of the cam rail which serves to bring the necessary pressure on the cutting means to render the same effective.

Further embodiments, modifications and changes may be resorted to within the spirit of the invention as here claimed.

What is claimed is:

1. In a wooden floor surfacing machine, an endless belt mounted to traverse a substantially horizontal orbit, means for driving the belt, guide means carried by the belt, and scraping tools having shanks operatively mounted in said guide means.

2. In a wooden floor surfacing machine, an endless belt mounted to traverse a substantially horizontal orbit, means for driving the belt, guide means carried by the belt, scraping tools having shanks operatively mounted in said guide means, and a cam device arranged to press the scraping tools into effective engagement while they are carried past the cam by the chain belt.

3. In a wooden floor surfacing machine, an endless belt mounted to traverse a substantially horizontal orbit, means for driving the belt, guide means carried by the belt, scraping tools having shanks operatively mounted in said guide means, a cam device arranged to press the scraping tools into effective engagement while they are carried past the cam by the chain belt, and means for varying the position of the cam to control the action of the scraping tools.

4. In a wooden floor surfacing machine, an endless belt mounted to traverse a substantially horizontal orbit, means for driving the belt, guide means carried by the belt, scraping tools having shanks operatively mounted in said guide means, a cam device arranged to press the scraping tools into effective engagement while they are carried past the cam by the chain belt, and means for varying the position of the cam to control the action of the scraping tools, said means including automatically acting devices yieldingly resting on the floor surface being operated upon.

5. In a wooden floor surfacing machine, an endless belt mounted to traverse a substantially horizontal orbit, means for driving the belt, guide means carried by the belt, scraping tools having shanks operatively mounted in said guide means, a cam device arranged to press the scraping tools into effective engagement while they are carried past the cam by the chain belt, means for carrying the position of the cam to control the action of the scraping tools, and manually controlled means for adjusting the cam to regulate the action thereof on the scraping tool.

6. In a wooden floor surfacing machine, an endless traveling series of scraping tools, cam means for pressing the tools into effective position, means for varying the position of the cam means, and means for indicating undulations in the general plane of the floor.

7. In a wooden floor surfacing machine, a wheel frame, a belt chain mounted on the frame and adapted to traverse a horizontal orbit, guides carried by the belt chain, tool bars slidably mounted in the guides, a cam device mounted on the frame and adapted to exert downward pressure on the tool bars, said bars being provided with scraping means at their lower ends.

8. In a wooden floor surfacing machine, a wheel frame, a belt chain mounted on the frame and adapted to traverse a horizontal orbit, guides carried by the belt chain, tool bars slidably mounted in the guides, and a cam device mounted on the frame and adapted to exert downward pressure on the tool bars, said bars being provided with scraping means at their lower ends and provided with yieldable polishing means at their lower ends.

In testimony whereof I have signed my name to this specification.

J. W. STUBBLEFIELD.